US009818171B2

(12) United States Patent
Zaitsev et al.

(10) Patent No.: US 9,818,171 B2
(45) Date of Patent: Nov. 14, 2017

(54) DEVICE INPUT AND DISPLAY STABILIZATION

(71) Applicant: Lenovo (Singapore) Pte. Ltd., Singapore (SG)

(72) Inventors: Grigori Zaitsev, Durham, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 5 days.

(21) Appl. No.: 14/669,484

(22) Filed: Mar. 26, 2015

(65) Prior Publication Data

US 2016/0283015 A1    Sep. 29, 2016

(51) Int. Cl.
| G06F 3/041 | (2006.01) |
| G06T 3/40 | (2006.01) |
| G06F 3/01 | (2006.01) |
| G06F 3/0346 | (2013.01) |
| G06F 3/0488 | (2013.01) |
| G06F 1/16 | (2006.01) |

(52) U.S. Cl.
CPC ............... *G06T 3/40* (2013.01); *G06F 3/013* (2013.01); *G06F 3/0346* (2013.01); *G06F 1/1694* (2013.01); *G06F 3/0488* (2013.01)

(58) Field of Classification Search
CPC ...... G06F 3/013; G06F 3/0346; G06F 3/0412; G06F 3/0416; G06T 3/40
USPC ........................... 345/156, 170–178; 396/72
See application file for complete search history.

(56) References Cited

U.S. PATENT DOCUMENTS

| 9,232,138 B1* | 1/2016 | Baldwin | H04N 5/23264 |
| 2008/0199167 A1* | 8/2008 | Daly | G06T 5/006 |
| | | | 396/72 |
| 2012/0105486 A1* | 5/2012 | Lankford | G06F 3/013 |
| | | | 345/661 |
| 2013/0162603 A1* | 6/2013 | Peng | G06F 3/0418 |
| | | | 345/178 |
| 2013/0234929 A1* | 9/2013 | Libin | G06F 3/01 |
| | | | 345/156 |

* cited by examiner

*Primary Examiner* — Tony Davis
(74) *Attorney, Agent, or Firm* — Ference & Associates LLC

(57) ABSTRACT

One embodiment provides a method, involving: displaying, on a display device, display data; sensing, using a device sensor, movement of the display device; determining, based on the movement sensed, one or more responsive actions; executing, using a processor, the one or more responsive actions to adjust a user interface element. Other aspects are described and claimed.

20 Claims, 4 Drawing Sheets

DEVICE INPUT AND DISPLAY STABILIZATION

BACKGROUND

Technology and communication devices (e.g., smartphones, tablets, etc.) have become so prevalent that users always have their device close at hand. Whether the user is required to carry their device as a work tool, or whether they just view their device as a personal necessity it can't be denied that our use of electronic devices has inundated every aspect of our lives. We are on our devices while we walk, ride in cars, ride in buses, ride in trains, or any other normal daily activity.

However, the conditions during these activities are not always optimal for the usage of a device, especially while the user of a smartphone or tablet is moving (e.g., riding public transit, walking, etc.). When using a device in a shaky or tumultuous environment it can be difficult to read or view what is being shown on the display. Additionally, it can be difficult for a user to interact with the device (e.g., press input buttons, enter text, etc.) when the device is unstable or in motion. Thus, a solution is needed to improve a user's interaction with a device when the device is experiencing movement and affecting the user's experience.

BRIEF SUMMARY

In summary, one aspect provides a method, comprising: displaying, on a display device, display data; sensing, using a device sensor, movement of the display device; determining, based on the movement sensed, one or more responsive actions; executing, using a processor, the one or more responsive actions to adjust a user interface element.

Another aspect provides an information handling device, comprising: a processor; a display device; a device sensor; a memory device that stores instructions executable by the processor to: display data; sense movement of the device; determine, based on the movement sensed, one or more responsive actions; execute the one or more responsive actions to adjust a user interface element.

A further aspect provides a product, comprising: a storage device having code stored therewith, the code being executable by a processor and comprising: code that displays, on a display device, display data; code that senses, using a devices sensor, movement of the display device; code that determines, based on the movement sensed, one or more responsive actions; code that executes, the one or more responsive actions to adjust at least a part of a user interface element.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
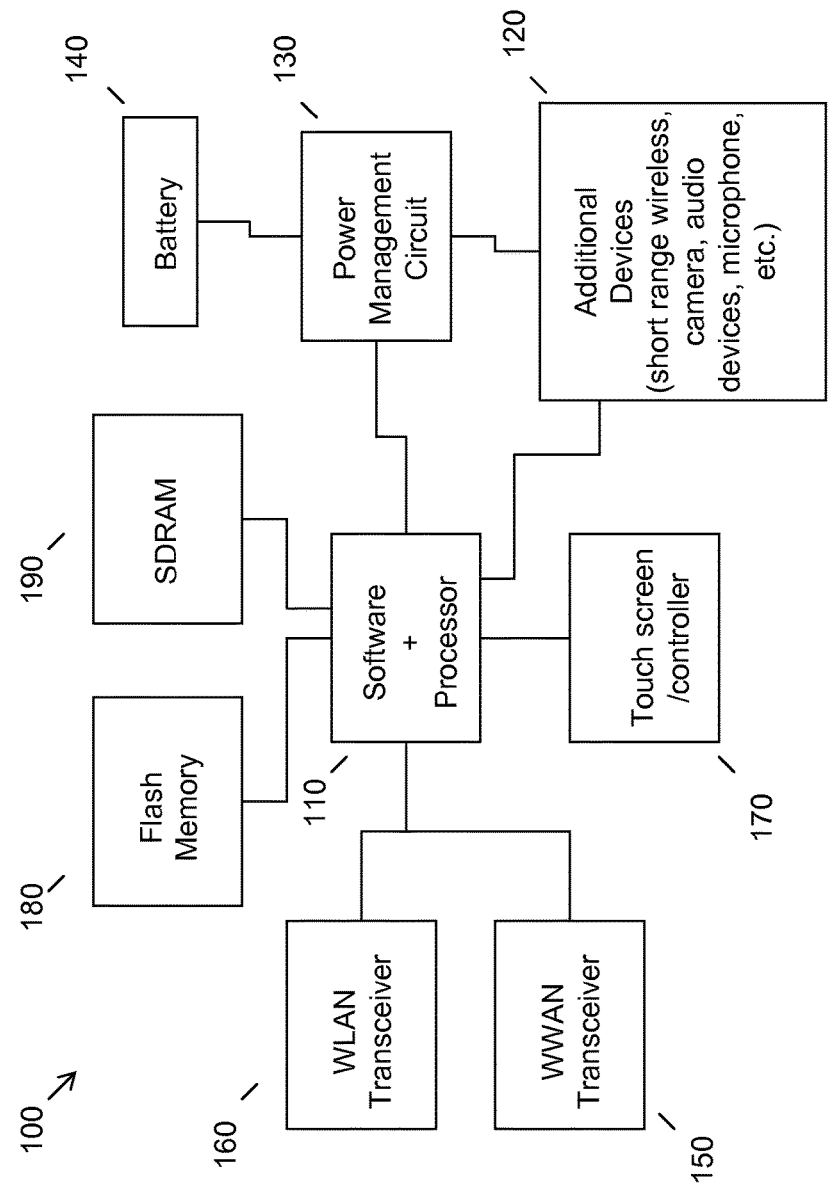
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Mobile devices (e.g., smartphones, tablets, smart watches, etc.) are typically used in a variety of settings. They are typically carried at all times and used in all situations. However, reading and interacting with a digital screen can be difficult, particularly when a user is in motion. For example, if a user is walking and attempting to read a news article it can be difficult to interpret the text due to the motion caused by the user walking Additionally, a user may which to consume some form of media (e.g., a video) on their device while riding on a bus or other form of public transit.

It can be difficult for a user to focus on textual information while in an unstable environment. It is also possible to experience motion sickness when reading while in motion. For example, when a user is reading text on a digital device in the back seat of a car. In this context, often the user's eyes are fixed on the device and the user's peripheral vision is viewing the interior of the car. This gives the user a visual illusion of being still. However, as the car goes over bumps, turns, or changes its velocity, the user's other senses detect the motion and it can cause the user to experience discomfort.

In addition to reading, interacting with a touch sensitive device can be difficult in turbulent conditions. A user may intend to press a button displayed in a particular location on a smart phone screen, but due to the movement or vibration of the device, the user may not be able to touch a particular button accurately. This can lead to the user pressing the wrong location on the screen. This may lead to the user not touching the button entirely and requiring a second attempt or it could cause the user to press an unintended button.

Additionally, the inability to press the desired area on a touch screen device (e.g., a smartphone, tablet, etc.) can cause serious problems when trying to enter text (e.g., composing an email or text).

Currently, if a user is having trouble viewing or interacting with media on their device, one option is to increase the image or font size of the element displayed manually. Alternatively, they may be able to change the settings on their device to constantly display the data (e.g., text, pictures, graphical user interfaces (GUI), etc.) in a larger format. Both of these alternatives are overly burdensome to the user, and the latter forces the user to view all of their content in a large format.

The technical issue presents problems for a user in that the user may be unable to view and interact with (consume) the data (e.g., media) on the device when in motion. Conventional solutions are impractical and do not address the root cause of the issue, i.e., movement, which only occurs during a limited duration. However, if an alternative existed that could dynamically determine if a device is experiencing a particular type of movement and automatically take steps to limit that disturbance, especially if the movement affects the user's experience, it would greatly improve the overall user experience with their electronic devices.

Accordingly, an embodiment provides a method for displaying a user interface element (e.g., text, pictures, text entry fields, applications interfaces, user input buttons, images, video, etc.). The user interface element may be generally referred to herein as display data, image, GUI, or the like. In an embodiment, while the data is being displayed, the device monitors its current movement, including for example monitoring the intensity of the movement, its duration, and/or other characteristics (e.g., repetitive or patterns of motion). Using this sensed motion data, the device can determine if the amount or character of device movement is impacts the user's ability to interpret and interact with what is being displayed on the screen. For example, if the sensed movement exceeds a predetermined time or magnitude threshold, an embodiment allows the device to take active steps to improve the user experience.

In addition, an embodiment may use other sensed data, e.g., relating to the user, and incorporate this additional data into an analysis of how movement is impacting the user's experience and/or what corrective action(s) might be appropriate. For example, an embodiment may detect the user's gaze and determine where on the display screen the user is looking Therefore, if it is determined that the user is attempting to view a particular part of the display screen, e.g., an image, an embodiment may adjust the visual display to stabilize the image or otherwise improve (e.g., enlarge) the visual appearance of the image the user is currently looking at. This enhances the user's ability to interpret and interact with what is being displayed on the screen. Thus, if the movement exceeds the predetermined threshold, an embodiment can take active steps to improve the portion of the user interface element that the user is focused on. This allows for specific aspects of the display to be altered to improve usability.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
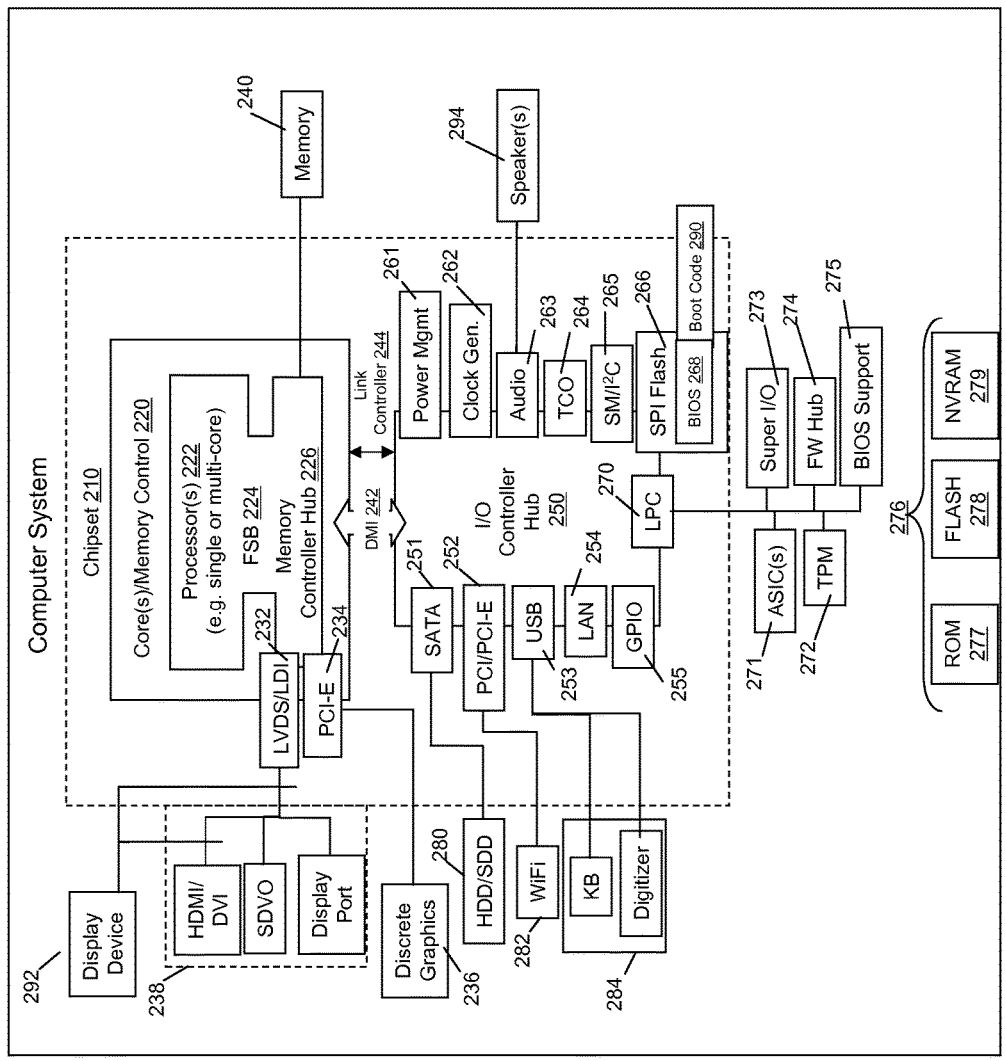
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to view media or communicate with others while in shaky or mobile environments. For example, the circuitry outlined in FIG. 1 may be implemented in a tablet or smart phone embodiment, whereas the circuitry outlined in FIG. 2 may be implemented in a laptop personal computer embodiment.

Figure 3:
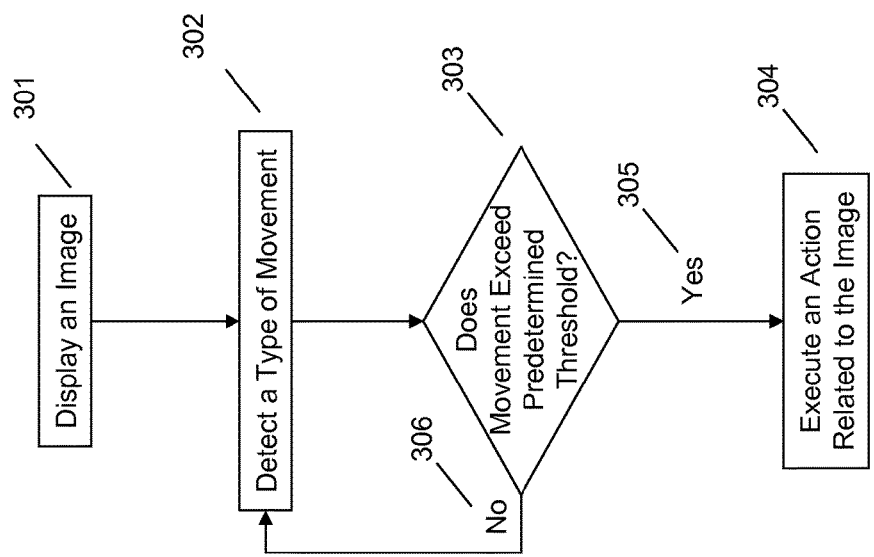
FIG. 3 illustrates an example method of display stabilization.

Referring now to FIG. 3, in an embodiment, a display device (e.g., a screen on a smartphone, tablet, smart watch, laptop, monitor, etc.) displays data such as an image at 301. It is important to note that throughout specification the term image is used as a non-limiting example of user interface element or display data, however, unless specifically limited, the term "image" may be read to include any feasible data that can be displayed on a display device or screen. Other non-limiting examples of display data may include: text data (e.g., a news article or word processing document), picture data, drawing data, animation data, web page data, GUI windows, GUI icons, GUI menus, GUI pointers, input fields, etc.

Additionally, an embodiment may detect at least one type of movement 302. The movement may be detected by an onboard sensor or a collection of sensors integrated with the device (e.g., gyroscope, accelerometer, etc.) or a detached sensor or group of sensors within reasonable proximity of the device and in communication therewith, e.g., via near field or short range wireless communication. For example, a sensor used by an embodiment to output sensed motion data may include an accelerometer, which measures proper acceleration (g-force) or change in velocity. Additionally or alternatively, the sensor could be a gyroscope, which measures orientation by detecting angular momentum. Additionally, the device may include a compass, which can detect direction relative to the geographical cardinal directions.

The movement of the device may be constant or varied, e.g., the acceleration may be intermittent and sudden or may be of a fairly regular pattern and focused in a particular direction. Additionally, the movement can originate from the user (e.g., the user walking or running), or external forces (e.g., automobile vibrations, train or subway vibrations or stop and start accelerations, the unstable but regular motion of a boat, etc.). For example, a user could be reading a news article while riding on a city bus. The vibrations and jarring nature of the bus starts and stops, combined with the ever present potholes could make it difficult for the user to comfortably and conveniently read their news article or interact with their device.

In an embodiment, once the device detects a movement 302, a determination is made as to whether or not the movement exceeds a predetermined threshold 303. The predetermined threshold is designed to determine when a movement or set of movements is of great enough magnitude to cause complications with the user's viewing experience or inhibit the user's ability to provide input. By way of example, an embodiment may determine that a user moving his or her smart phone from a pocket to a comfortable viewing angle in hand. This brief duration of movement may not be sufficient movement to exceed a predetermined time threshold and thus an embodiment may determine that it would not impact the user's experience at 306.

Alternatively, a user may be riding as a passenger in a car on the highway, which causes his or her phone to experience repeated high speed vibrations. This intense movement and its duration may be enough to exceed predetermined timing and magnitude thresholds at 305, thus indicating an impact in the user's experience.

In an embodiment, once it is determined that the movement exceeds the predetermined threshold 305, an embodiment takes an action at 304 to improve the visual presentation of the displayed data. This action may vary greatly and will be discussed in detail in the following paragraphs. However, the action would be related to the image or other data displayed on the device and is implemented with the aim of improving the user's experience with the device as it undergoes potentially disruptive motion. An embodiment may determine that the movement did not exceed the predetermined threshold(s) at 306. If the threshold(s) is/are not exceeded, an embodiment operates to continue to monitor the relative movement at 302. This monitoring will continue while an image is displayed at 301 and until such time as the movement either does exceed the threshold(s) or the display is no longer in use.

An embodiment may implement various thresholds with respect to determining sensed motion is disruptive to the user. As has been described herein, these thresholds may include timing and/or magnitude thresholds. In an embodiment, a pattern or similar type analysis also may be performed to predict that sensed motion data maps to or is associated with a device state in which disruptive motion is occurring. By way of example, in addition to or in lieu of a time-based or magnitude threshold, an embodiment may detect sensed motion data of a particular quality from the accelerometer, gyroscope and/or other sensors that have been previously determined to map to a motion state. If such sensed data is detected, an embodiment may implement or take associated corrective action(s) to address this device state, e.g., responsive enlargement of an image or other display data, responsive movement of a displayed button or other displayed element, etc.

Figure 4:
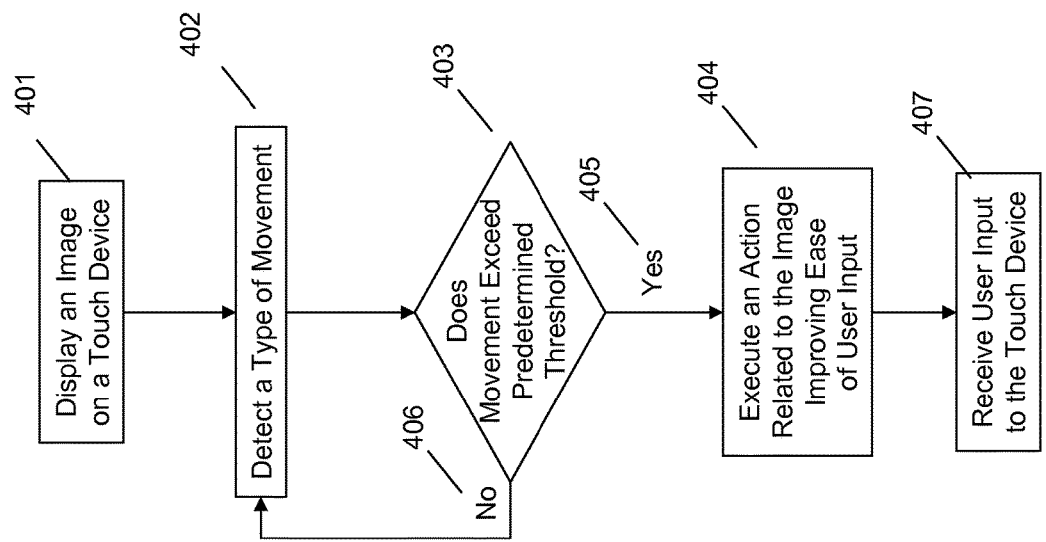
FIG. 4 illustrates an example method of improved stabilization for user input.

Referring now to FIG. 4, in an embodiment, the display device may be a touch device 170. The touch screen allows for user input (e.g., entering text, making selections, etc.) while displaying an image on the touch screen 401. For example, a user may be utilizing a mobile application with a GUI that accepts user input. An embodiment detects at least one type of movement of the device at 402. Again the movement could be created by constant or varied acceleration in any direction, originate from the user themselves (e.g., the user walking or running), or an external force (e.g., automobile, train or subway, etc.).

An embodiment determines if the sensed motion data maps to a predetermined device state at 403. If it is determined that the movement is associated with a predetermined device state at 405, an embodiment takes some corrective action at 404. For example, a user may wish to click an "ok" button displayed on the device screen. However, due to the small size of the button combined with the shaky environment, it may be difficult for the user to accurately press the desired button. This shaky motion may be sensed (e.g., by device sensors) and associated with a shaky motion device state. An embodiment in turn may execute a responsive or corrective action or actions, e.g., enlarging of the "ok" button, moving of the "ok" button in an opposite direction of sensed accelerometer data such that it remains displayed in a stable position with respect to the user (acting as a visual shock absorber), a combination of the foregoing, etc.

Additional data may be used by an embodiment to determine a device state requiring corrective action and/or the corrective action(s) to implement. For example, an embodiment may monitor a user's typical input, and determine that the user regularly misses a button by a certain distance during shaky conditions. Once the device detects the location of the user's input, it can identify the distance from the desired or predetermined location the user intends to press. By way of example, a user, while jogging may wish to change his music section and regularly uses only one hand to do so. It would then be possible for the device to make a determination that the user's input is almost always off center to the left (of the desired button) by 0.3 cm. After the device identifies the typical distance of the user error, it can calibrate the location and/or the size of the corrected display of the button.

In an additional embodiment, a calibration Calibrate based on statistics of GUI buttons misses correlated with acceleration and rotation vectors may be carried out. Allowing for an adjustment of the touch/pen/stylus coordinates. For example, if user hits the button center accurately when there is no acceleration detected, but misses button center by 10 pixels to the left when there is 5 g of right acceleration, next time when there is 5 g right acceleration, an adjustment should be preformed to adjust the touch coordinates by 10 pixels to the left to cancel the error introduced by shaking.

Other corrective actions may be implemented. For example, the color or background of displayed text could be changed to further aid the user in reading while in motion. By way of example, an embodiment may enlarge the text being displayed on the screen if the user is reading a news article while riding in a car or train.

If the movement(s) are not associated with a predetermined device state at 406, an embodiment may continue to monitor the relative movement 402.

As described herein, various sensed data may be used to determine if the device is undergoing motion and/or which corrective action(s) to take. For example, an embodiment may implement gaze tracking (camera and associated tracking software) to track a user's gaze. Once the gaze is detected and tracked, it may be determined where the user's gaze is currently focused in relation to the display screen. If it is determined that the user is focused on a particular element in the display, the action(s) taken to adjust the visual display in response to the motion of the device may be scoped to or applied to the particular element. Therefore, in an embodiment, only that portion of the display data (e.g., a particular image) may be stabilized, resized or moved as a corrective action.

The various embodiments described herein thus represent a technical improvement to display devices. Specifically, embodiments allow the display device to adjust in response to motion.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    displaying, on a display device, display data;
    sensing, using a device sensor, movement of the display device;
    determining, based on the movement sensed, one or more responsive actions comprising an adjustment to a location of touch coordinates associated with a user interface input element displayed by the display device, wherein the adjustment comprises identifying a distance, caused by the movement sensed, between a received user input and the user interface input element and adjusting the location of the touch coordinates by the identified distance;
    executing, using a processor, the one or more responsive actions to adjust the user interface input element.

2. The method of claim 1, wherein the one or more responsive actions comprise adjusting a screen location of the user interface input element.

3. The method of claim 1, wherein the one or more responsive actions further comprise adjusting a size of the user interface input element.

4. The method of claim 1, wherein the user interface input element comprises an input button with associated input functionality.

5. The method of claim 1, wherein the one or more responsive actions comprise increasing an input area associated with input functionality of the user interface input element without increasing a display size of the user interface input element.

6. The method of claim 5, wherein the one or more responsive actions comprise increasing a display size of the user interface input element.

7. The method of claim 1, further comprising:
    detecting, on the display device, a location of a user input; and
    identifying, using the location of the user input, a distance to a location within the display data.

8. The method of claim 7, wherein the one or more responsive actions comprise calibrating adjustment of the user interface input element based on the distance.

9. The method of claim 1, wherein the one or more responsive actions comprise repeatedly adjusting the user interface input element in response to repeated movements.

10. The method of claim 1, further comprising:
    detecting, at the display device, a location of user gaze;
    wherein the adjustment of the user interface input element is performed based on the location of user gaze.

11. An information handling device, comprising:
    a processor;
    a display device;
    a device sensor;
    a memory device that stores instructions executable by the processor to:
    display, on the display device, display data;
    sense movement;
    determine, based on the movement sensed, one or more responsive actions comprising an adjustment to a location of touch coordinates associated with a user interface input element displayed by the display device, wherein the adjustment comprises identifying a distance, caused by the movement sensed, between a received user input and the user interface input element and adjusting the location of the touch coordinates by the identified distance;
    execute the one or more responsive actions to adjust the user interface input element.

12. The information handling device of claim 11, wherein the one or more responsive actions comprise adjusting a screen location of the user interface input element.

13. The information handling device of claim 11, wherein the one or more responsive actions further comprise adjusting a size of the user interface input element.

14. The information handling device of claim 11, wherein the user interface input element comprises an input button with associated input functionality.

15. The information handling device of claim 11, wherein the one or more responsive actions comprise increasing an input area associated with input functionality of the user interface input element without increasing a display size of the user interface input element.

16. The information handling device of claim 15, wherein the one or more responsive actions comprise increasing a display size of the user interface input element.

17. The information handling device of claim 11, wherein the instructions are further executable by the processor to:
    detect, on the display device, a location of a user input; and
    identify, using the location of the user input, a distance to a location within the display data;
    wherein the one or more responsive actions comprise calibrating adjustment of the user interface input element based on the distance.

18. The information handling device of claim 11, wherein the one or more responsive actions comprise repeatedly adjusting the user interface input element in response to repeated movements.

19. The information handling device of claim 11, wherein the instructions are further executable by the processor to:
    detect, at the display device, a location of user gaze;
    wherein the adjustment of the user interface input element is performed based on the location of user gaze.

20. A product, comprising:
    a storage device having code stored therewith, the code being executable by a processor and comprising:
    code that displays, on a display device, display data;
    code that senses, using a device sensor, movement of the display device;
    code that determines, based on the movement sensed, one or more responsive actions comprising an adjustment to a location of touch coordinates associated with a user interface input element displayed by the display device, wherein the adjustment comprises identifying a distance, caused by the movement sensed, between a received user input and the user interface input element and adjusting the location of the touch coordinates by the identified distance;

code that executes the one or more responsive actions to adjust the user interface input element.

\* \* \* \* \*